(12) United States Patent
Misch et al.

(10) Patent No.: US 8,352,919 B2
(45) Date of Patent: Jan. 8, 2013

(54) OPERATION SUPPORT IN VERSIONING SYSTEMS

(75) Inventors: Frank Misch, Heidelberg (DE); Ralph Debusmann, Tamm (DE)

(73) Assignee: SAP AG, Walldorf (DE)

( * ) Notice: Subject to any disclaimer, the term of this patent is extended or adjusted under 35 U.S.C. 154(b) by 770 days.

(21) Appl. No.: 12/570,578

(22) Filed: Sep. 30, 2009

(65) Prior Publication Data

US 2011/0078658 A1 Mar. 31, 2011

(51) Int. Cl.
*G06F 9/44* (2006.01)
(52) U.S. Cl. ........................................................ 717/126
(58) Field of Classification Search ................... 717/126
See application file for complete search history.

(56) References Cited

U.S. PATENT DOCUMENTS

| | | | | |
|---|---|---|---|---|
| 7,937,685 | B2 * | 5/2011 | Weil et al. ........................ | 717/103 |
| 2008/0301639 | A1 * | 12/2008 | Bell et al. ........................ | 717/120 |
| 2010/0058294 | A1 * | 3/2010 | Best et al. ........................ | 717/122 |
| 2010/0222902 | A1 * | 9/2010 | Eldridge et al. ................. | 700/87 |
| 2011/0035726 | A1 * | 2/2011 | Davies et al. .................... | 717/110 |
| 2011/0125798 | A1 * | 5/2011 | Misch et al. ..................... | 707/785 |
| 2012/0179654 | A1 * | 7/2012 | Lukiyanov et al. ............. | 707/638 |

OTHER PUBLICATIONS

D. Dig et al., "Refactoring-aware Configuration Management for Object-Oriented Programs," 29th International Conference on Software Engineering (ICSE'07), 2007, pp. 427-436.

* cited by examiner

*Primary Examiner* — Philip Wang
(74) *Attorney, Agent, or Firm* — Fish & Richardson P.C.

(57) ABSTRACT

Implementations of the present disclosure provide a computer-implemented method that includes accessing computer code from a repository at a computer, registering a plurality of operations on the computer code at the computer, generating a changelist based on the operations, the changelist comprising a plurality of computer code objects affected by the operations, initiating a reversion operation to revert one or more of the computer code objects to a previous state, partitioning the computer code objects to provide independent first and second partitions, the first partition including an object set based on the computer code objects, and executing the reversion operation based on only the first partition including the object set.

21 Claims, 10 Drawing Sheets

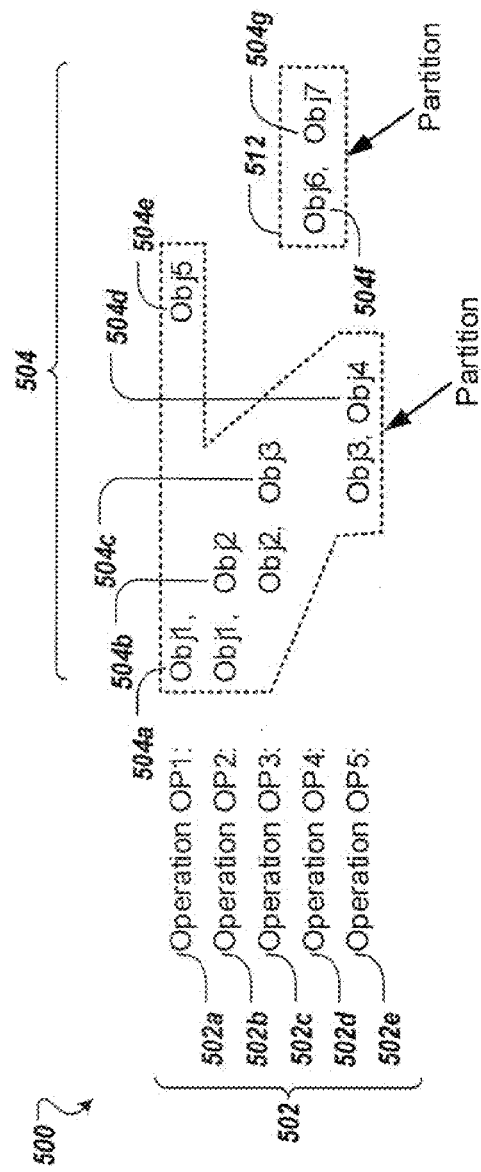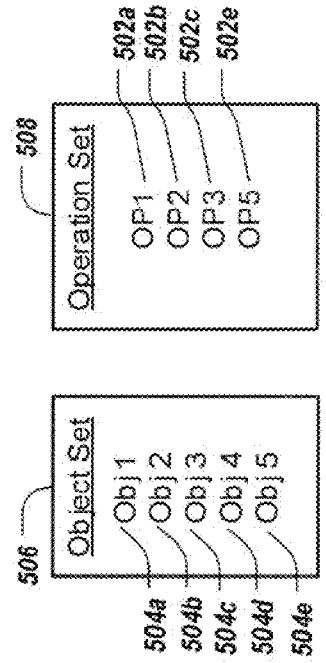
FIG. 5A
FIG. 5B

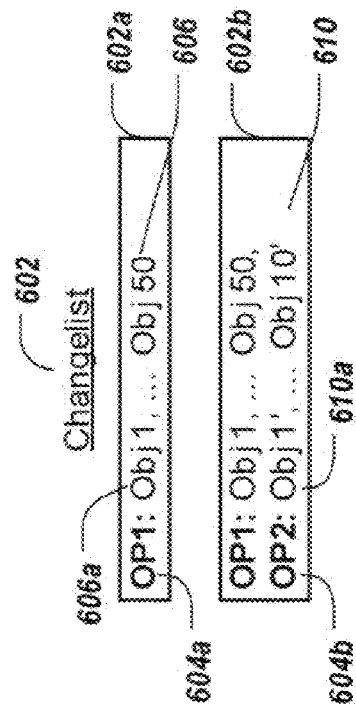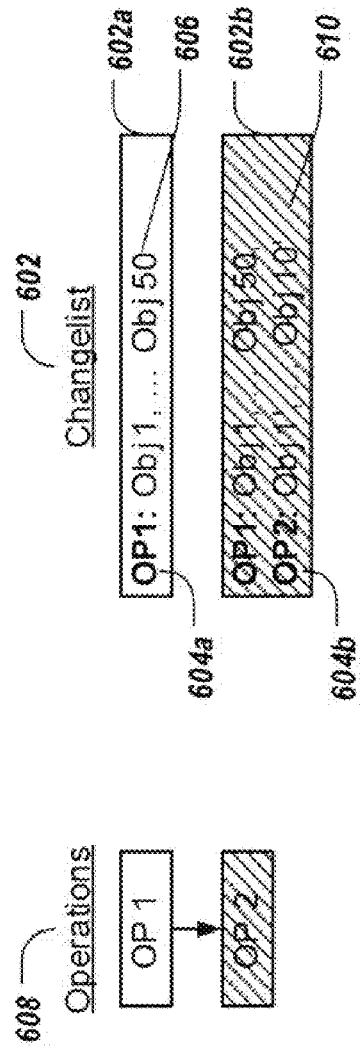
FIG. 6A
FIG. 6B

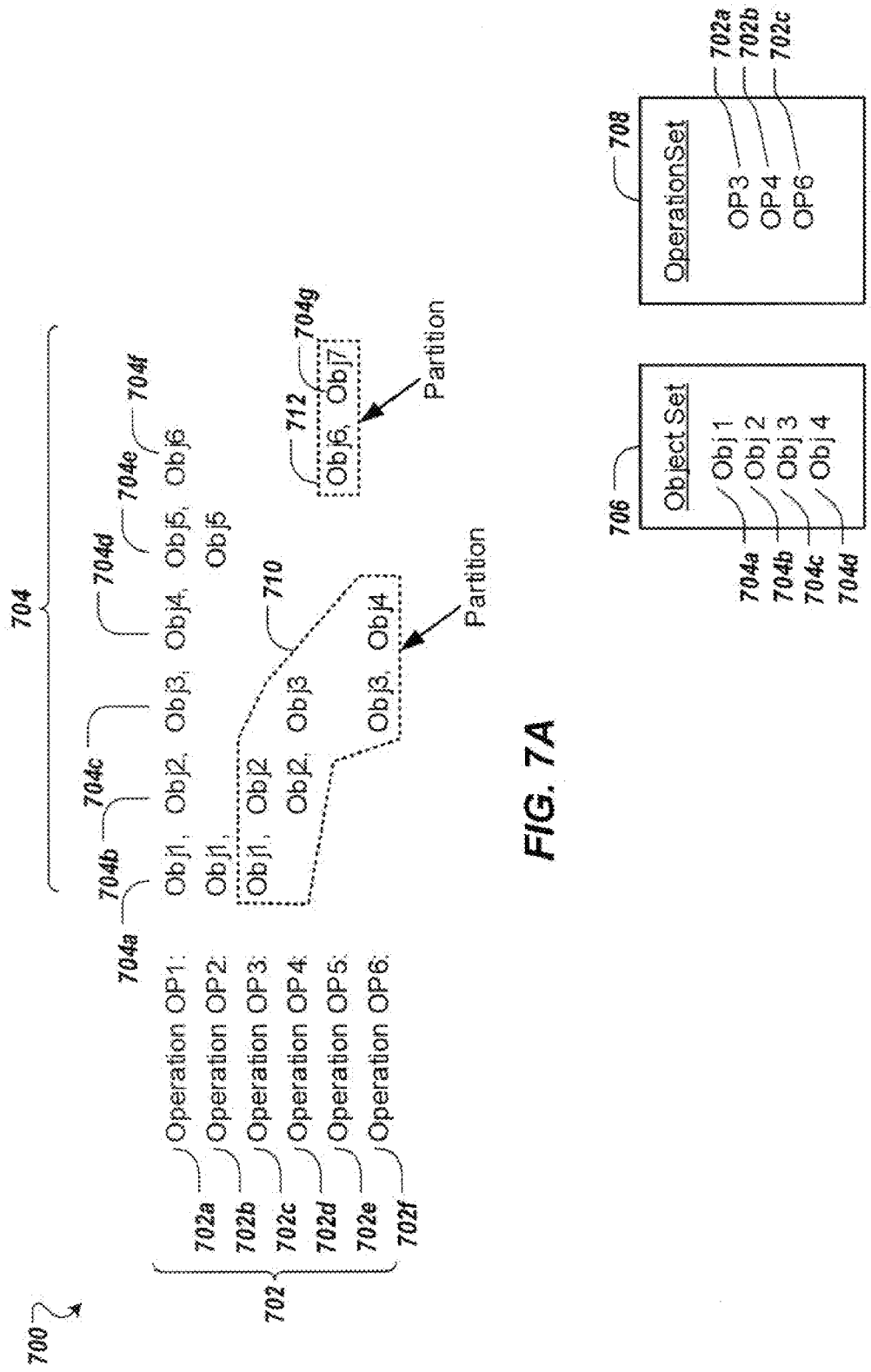

OPERATION SUPPORT IN VERSIONING SYSTEMS

BACKGROUND

An organization that performs software development can use software configuration management (SCM) to track and control changes in a software project during the software development process. SCM can identify the functional and physical attributes of the software components (e.g., source code files) for the software project at various points in time. SCM can also manage changes to identified attributes of the software components in order to maintain integrity and traceability for the software project throughout the entire software development process.

A SCM system can include revision control. Revision control can track and manage changes to software components. A SCM system that includes revision control can manage software component changes in an environment where the software development is by a team of developers where each member of the team can access and share each software component.

SUMMARY

Implementations of the present disclosure provide a computer-implemented method that includes accessing computer code from a repository at a computer, registering a plurality of operations on the computer code at the computer, generating a changelist based on the operations, the changelist comprising a plurality of computer code objects affected by the operations, initiating a reversion operation to revert one or more of the computer code objects to a previous state, partitioning the computer code objects to provide independent first and second partitions, the first partition including an object set based on the computer code objects, and executing the reversion operation based on only the first partition including the object set.

In some implementations, initiating the reversion operation comprises receiving an identification of an object of the plurality of computer code objects for reversion, and partitioning comprises generating the object set based on the object.

In some implementations, initiating the reversion operation comprises receiving an identification of an operation of the plurality of operations for reversion, and partitioning comprises generating the object set based on the operation.

In some implementations, the method further includes generating an operation set comprising a plurality of affected operations, wherein executing the reversion operation is further based on the operation set.

In some implementations, partitioning the computer code objects includes generating the object set including an object to be reverted, generating an operation set including an affected operation, determining that another object corresponds to the affected operation, and adding the other object to the object set.

In some implementations, partitioning the computer code objects includes generating an operation set including an operation to be reverted, generating the object set including an affected object, determining that another operation corresponds to the affected object, and adding the other operation to the operation set.

In some implementations, at least one of the operations includes a refactoring operation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes a database having computer code stored thereon, and a computer that is in communication with the database, the computer processing instructions to cause one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5A is another exemplar table including refactoring operations and corresponding objects.

FIG. 5B provides an exemplar object set and an exemplar operation set based on an exemplar reversion to an object of FIG. 5A.

FIG. 6A is an exemplar changelist that can be generated in accordance with implementations of the present disclosure.

FIG. 6B is an exemplar reversion of the changelist of FIG. 6A in accordance with implementations of the present disclosure.

FIG. 7A is another exemplar table including refactoring operations and corresponding objects.

FIG. 7B provides an exemplar object set and an exemplar operation set based on an exemplar reversion to an operation of FIG. 7A.

Like reference symbols in the various drawings indicate like elements.

DETAILED DESCRIPTION

Figure 1:
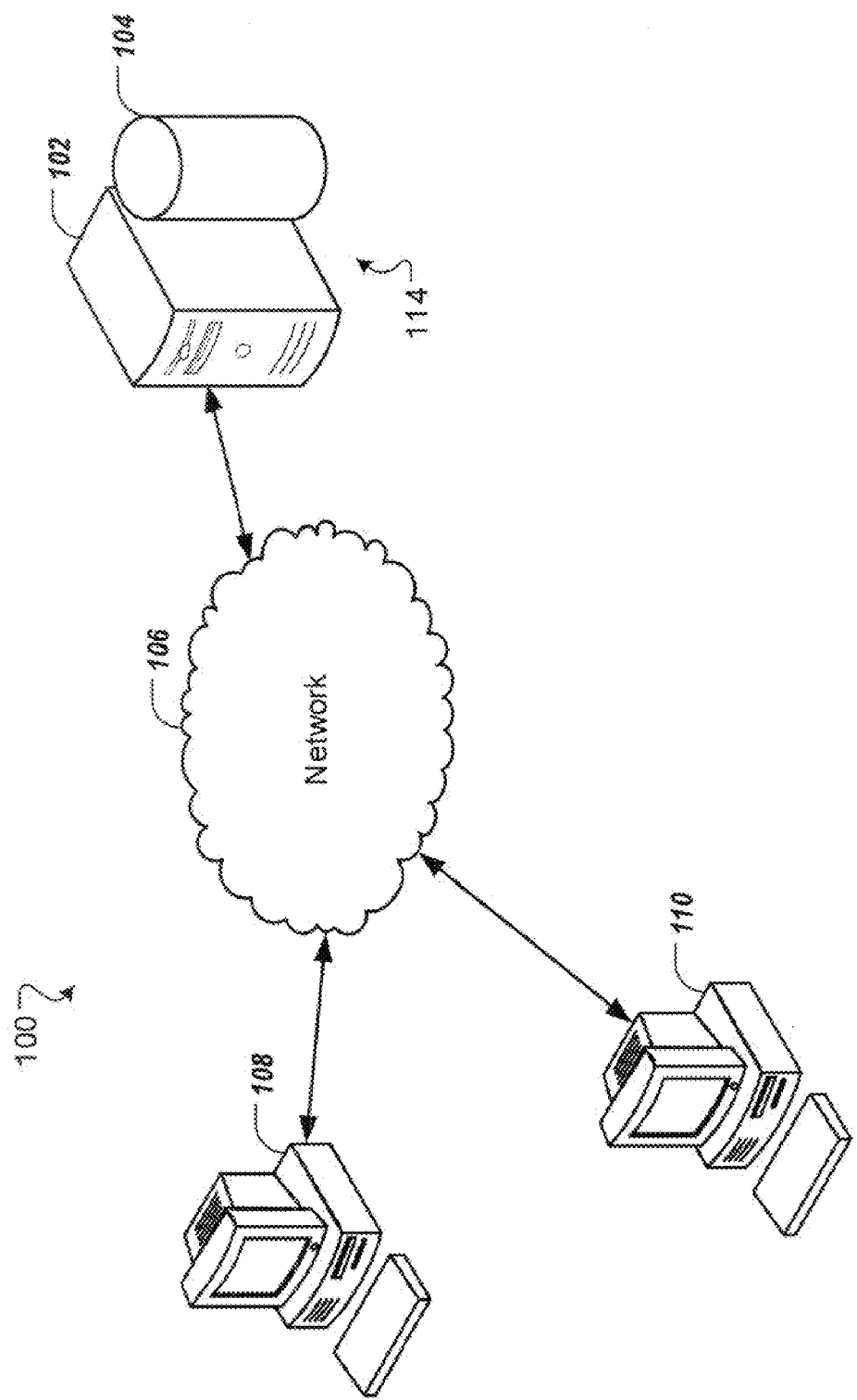
FIG. 1 is a diagram of an exemplar network architecture that can be used in accordance with implementations of the present disclosure.

Referring now to FIG. 1, a schematic illustration of an exemplar system 100 in accordance with implementations of the present disclosure can include a plurality of clients 108, 110, and a computer system 114. The computer system 114 can include an application server 102 and a database 104. The computer system 114 and the clients 108, 110 can be connectively coupled for communication over a network 106.

In some implementations, the system 100 can be a distributed client/server system that spans one or more networks such as network 106. In some implementations, each client (e.g., clients 108, 110) can communicate with the application server 102 via a virtual private network (VPN), Secure Shell (SSH) tunnel, or other secure network connection. In some implementations, the network 106 can include the Internet, a wireless service network and may also include the Public Switched Telephone Network (PSTN). In other implementations, the network 106 may include a corporate network (e.g., an intranet) and one or more wireless access points.

Each client (e.g., clients 108, 110) can establish its own session with the application server 102. Each session can be semi-permanent as it can be established at one point in time and torn down at another. Each session can involve two-way information exchange between the computer system 114 and each individual client 108, 110. For example, a Hypertext Transfer Protocol (HTTP) session can allow the association of information with individual users. A session can be stateful where at least one of the communicating parts (e.g., the application server 102 or the client (e.g., clients 108, 110)) can save information about the session history in order to be able to communicate. Alternatively, stateless communication includes independent requests with associated responses.

Multiple clients (e.g., clients 108, 110) can communicate via network 106 with the application server 102. In order to run an application each client (e.g., clients 108, 110) can establish a corresponding session with the application server 102. For example, the database 104 can store software components for a software development project in a central repository. An application server (e.g., application server 102) can host a software configuration management (SCM) application. Use of the SCM application by developers working on a software project can prevent multiple developers from accessing and editing the same source code file in the central repository at the same time. For example, developers using a plurality of clients (e.g., clients 108, 110) can run the SCM application on the application server 102 to access source code files stored in a central repository in the database 104.

In some implementations, the SCM application can allow a first developer to lock a source code file in the central repository for editing (e.g., check-out). If a first developer checks out a source code file, no other developer can obtain write access to the source code file. A developer can check-out a source code file, which places a working copy of the source code file in the central repository on the developer's client. Other developers may read the source code file in the central repository but other developers cannot change the source code file. Once the first developer unlocks the file (e.g., either checks-in the source code file, which may be an updated version of the file, or performs an undo of the check-out where the source code file in the central repository remains unchanged) other developers can access the file. In this type of SCM application, only one developer at a time can edit a source code file in the central repository.

In some implementations, a SCM application can allow multiple developers to edit the same source code file in the central repository at the same time (e.g., multiple developers can check-out the same source code file from the central repository). A first developer can check-out a source code file (e.g., a copy of the source code file in the central repository can be downloaded to the first developer's local client (e.g., client 108) and used by the first developer as a working copy of the source code file). A second developer can check-out a source code file (e.g., a copy of the source code file in the central repository can be downloaded to the second developer's local client (e.g., client 110) and used by the second developer as a working copy of the source code file). A first developer can check-in the changes made to the local copy of the source code file to the central repository. The SCM system can include functions to allow the second developer, also editing the source code file, to check-in their local changes to the source code file by merging their changes into the source code file in the central repository (where the source code file in the central repository now includes changes made by the first developer). The SMC application can preserve changes made to the source code file by the first developer when incorporating the changes made to the source code file by the second developer.

A changelist, which can also be referred to as activities, can identify a group or set of changes made by a developer to a local copy of source code files at single check-in. The changelist can include the changes made by the developer on the local copy of the source code files from check-out of the files until check-in of the files. The developer can collect changes made to the local copy of the source code files in the changelist. When the developer determines the source code changes are consistent and available for sharing with other developers, the developer can check-in the source code files, which submits the changes to the files to the SCM application. The SCM application can use the changelist to incorporate the changes made by the developer in the local copy of the source code files into the corresponding source code files in the central repository.

In some implementations, the SCM application can save a version of a source code file after each developer operation on the local client responsible for the check-out of the file. The changelist can represent a sequential view of source code edits by the developer. The SCM application can view a historical version of the source code at a particular time during the editing of the file using a changelist identification (ID). For example, a developer, using a local client (e.g., client 108) can connect to an application server (e.g., application server 102) by way of a network (e.g., network 106). The developer can run a SCM application hosted on the application server (e.g., application server 102). The developer can check-out a source code file for editing, (the SCM application can download a copy of the source code file from the central repository (e.g., database 104) to the local client (e.g., client 108)). Upon initial check-out, the SCM application can generate a changelist. In some implementations, the SCM application can place the changelist on the developer's local client (e.g., client 108) in a local changelist file. In some implementations, the SCM application can place the changelist on the application server (e.g., application server 102) in a changelist file.

SCM applications that allow atomic multi-change check-ins can rely on changelists to maintain a central repository in a consistent state. For example, if an operation on the central repository is interrupted before completion, the changelist can ensure that the repository will not be left in an inconsistent state.

In some implementations, a developer during a software development process may perform one or more consolidation or "clean-up" processes on an existing source code base. The developer can perform the consolidation process to improve the overall quality, readability, maintainability, or extensibility of the existing source code base at that point in the development process. The consolidation process can simplify the code structure.

One exemplar type of consolidation process can be refactoring. Refactoring operations can improve an existing source code base by changing the internal structure of the code without changing the external behavior of the code. Refactoring an existing source code base can produce a revised source code base that does not add new functionality to the source code. However, the revised source code base may be easier to understand, use and maintain.

In some implementations, a consolidation process can be a mass operation. A mass operation can perform an operation on a plurality of objects in a source code base at the same time. For example, a mass operation can be the deletion of a specific number of objects at the same time. In some implementations, a refactoring operation can be a mass operation. However, a refactoring operation can implement additional functions along with a mass operation.

In some implementations, a source code file can include one or more software objects (computer code objects). A developer or team of developers can design and implement the software objects. Examples of software objects can include, but are not limited to, code files, configuration objects, internet content and security roles. Each software object can have a unique name. The object can store its state in fields or variables and expose its behavior through methods or functions. Objects allow for data encapsulation and can be used in object-oriented programming. In some implementations, a refactoring operation may affect one or more source code files and can affect a multitude of software objects (e.g., 10 to 500 objects). In some implementations, a developer may need to perform a plurality of refactoring operations on an existing source code base in order for the revised source code base to reach a consistent state. The developer can check-out the source code files needed to perform the refactoring operations from the existing source code base. The developer can perform a series of refactoring operations on the local checked-out source code files. A changelist can collect and record the changes performed by the developer (the refactoring operations) to the source code files. When the revised source code reaches a consistent state, the developer can then check-in the revised source code files updating the source code in the central repository. An SCM application can use the changelist to incorporate the changes made by the developer in the local copies of the source code files into the source code files in the central repository.

In some implementations, while performing a series of refactoring operations, a developer may perform a single refactoring operation in error. For example, the developer may perform an incorrect refactoring operation in the series of refactoring operations. In another example, the developer may not correctly perform one of the refactoring operations in the series of refactoring operations. In some implementations, while performing a series of refactoring operations, a developer may perform an additional refactoring operation in an attempt to return the source code base to a stable state. If unsuccessful, the developer may want to revert the refactoring operation and return the source code to the previous state prior to the refactoring operation.

In some implementations, in order for the developer to revert a refactoring operation in a series of refactoring operations, the developer can revert or discard the entire series of refactoring operations (e.g., the developer can undo the check-out of the source code resulting in no changes to the existing source code base in the central repository). This can result in the loss of all refactoring operations since the last successful check-in of the source code base (the source code base will remain the same; it will not be revised). Additionally, in some implementations, in order for the developer to undo a refactoring operation in a series of refactoring operations, the developer can undo the series of refactoring operations on an object-by-object basis for each object involved in the series of refactoring operations. The objects can be reverted to their state prior to the performance of any refactoring operations. A developer may perform either correction in order to return the source code base to a stable state. In order to implement either correction, developers can loose a significant amount of development time undoing or discarding the refactoring operations.

In some implementations, a developer may perform a series of refactoring operations a single operation at a time. For example, the developer can check-out the source code for the single refactoring operation, perform the refactoring operation, verify the integrity of the source code base and check-in (e.g., submit the changelist) the revised source code reflective of the single refactoring operation. The developer can follow this process for each refactoring operation. If a refactoring operation fails, as described above, the developer can revert the changelist for the single refactoring operation (e.g., the developer can undo the check-out) or the developer can manually undo the single refactoring operation object by object. In this case, only the last refactoring operation is lost. However, this can be a time consuming process as the developer confirms the integrity of the source code base after each refactoring operation. Additionally, a plurality of refactoring operations may be necessary in order to return a code base to a stable state.

Figure 2A:
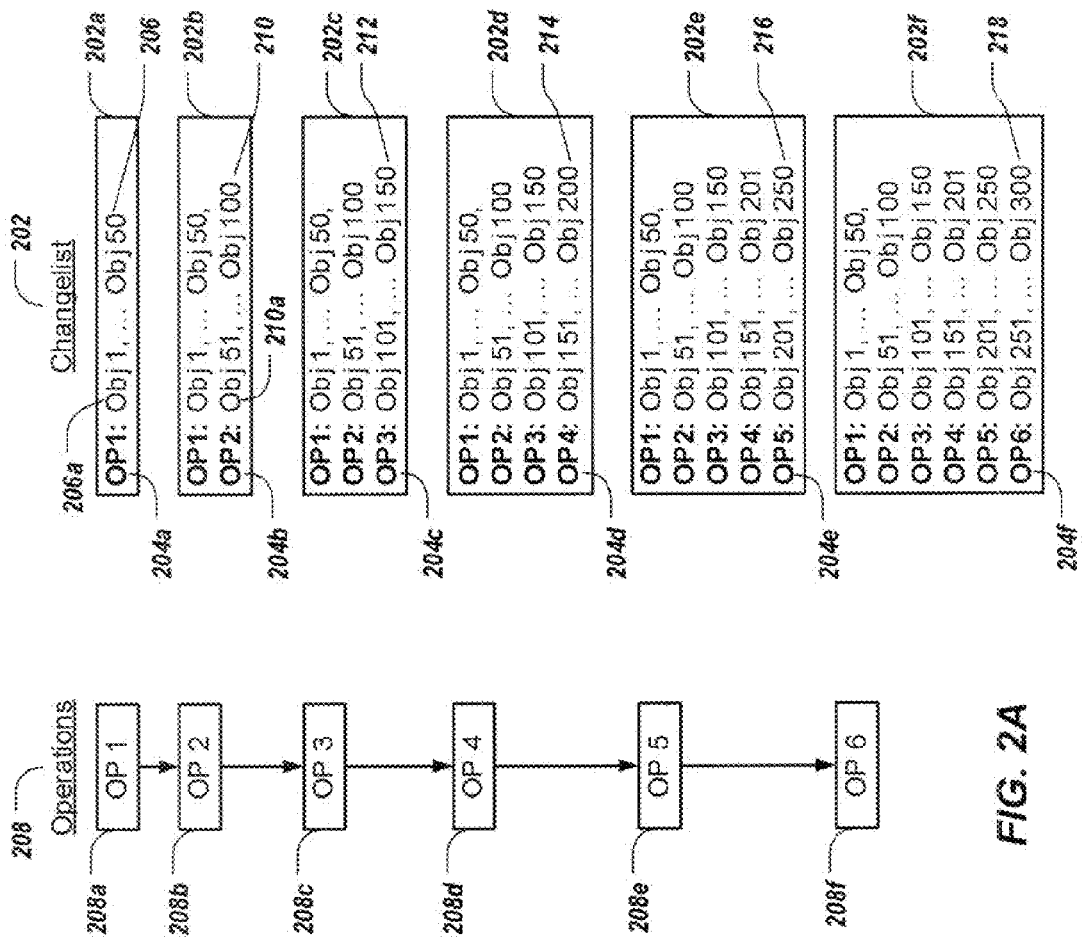
FIG. 2A is an exemplar changelist that can be generated in accordance with implementations of the present disclosure.

Referring now to FIG. 2A, an exemplar changelist 202 that can be generated in accordance with implementations of the present disclosure is shown. As described above, a changelist can identify a set of changes made by a developer in source code files at a single check-in of the files.

A developer may perform a series of refactoring operations on an existing source code base. For example, a developer, using a local client (e.g., client 108) can connect to an application server (e.g., application server 102) by way of a network (e.g., network 106). The developer can run a SCM application hosted on the application server (e.g., application server 102). The developer can check-out one or more source code files that may include one or more objects for one or more refactoring operations (the SCM application can download copies of the source code files from the central repository (e.g., database 104) to the local client (e.g., client 108)). Upon initial check-out of one or more source code files, the SCM application can generate a changelist on the developer's local client (e.g., client 108) in a local changelist file.

In some implementations, the changelist can include an operation entity. The operation entity can include one or more object identifiers. The operation entity can be associated with a refactoring operation. Each object identifier can be associated with a software object adapted by the refactoring operation associated with the operation entity. In the example in FIG. 2A, a developer can perform a series of refactoring operations 208. The changelist 202 can include operation entities 204a-f. Refactoring operations 208a-f can be associated with operation entities 204a-f, respectively. A plurality of object identifiers 206 (fifty in the exemplar case of FIG. 2A) can be included in operation entity 204a. Each object identifier 206 can be associated with a software object (e.g., object identifier 206a can be associated with software object 1) adapted by the refactoring operation 208a.

For example, refactoring operation 208a can be a renaming operation (e.g., "rename object 1", where object identifier 206a can be associated with software object 1). Refactoring operation 208a can involve the adaptation of fifty different objects (e.g., object 1 and an additional forty-nine objects, objects 2-50) associated with object identifiers 206 in the operation entity 204a in the changelist 202. Upon completion of the refactoring operation 208a, the changelist 202 can be updated to include operation entity 204a as in changelist view 202a. The developer may not check-in the resultant revised source code as adaptations of one or more software objects may need to be performed in order to put the source code into a consistent stable state. The developer can continue to perform refactoring operations (e.g., refactoring operations 208b-e).

The changelist can be updated as the developer performs each refactoring operation. For example, operation entity 204b can be associated with refactoring operation 208b. A plurality of object identifiers 210 can be included in operation entity 204b. Each object identifier 210 can be associated with a software object (e.g., object identifier 210a can be associated with software object 51) adapted by the refactoring operation 208b. Refactoring operation 208b can involve the adaptation of the plurality of different objects (e.g., objects 51-100) associated with object identifiers 210 in the operation entity 204b in the changelist 202. Upon completion of the refactoring operation 208b, the changelist 202 can be updated to include operation entity 204b as shown in changelist view 202b.

Proceeding in a similar manner, operation entity 204c can be associated with refactoring operation 208c. Refactoring operation 208c can involve the adaptation of a plurality of different objects (e.g., objects 101-150) associated with object identifiers 212 in the operation entity 204c in the changelist 202. Upon completion of the refactoring operation 208e, the changelist 202 can be updated to include operation entity 204c as shown in changelist view 202c. Operation entity 204d can be associated with refactoring operation 208d. Refactoring operation 208d can involve the adaptation of a plurality of different objects (e.g., objects 151-200) associated with object identifiers 214 in the operation entity 204d in the changelist 202. Upon completion of the refactoring operation 208d, the changelist 202 can be updated to include operation entity 204d as shown in changelist view 202d. Operation entity 204e can be associated with refactoring operation 208e. Refactoring operation 208e can involve the adaptation of a plurality of different objects (e.g., objects 201-250) associated with object identifiers 216 in the operation entity 204e in the changelist 202. Upon completion of the refactoring operation 208e, the changelist 202 can be updated to include operation entity 204e as shown in changelist view 202e.

According to the changelist view 202e, the developer has completed five refactoring operations. The revised source code may be in an inconsistent state and additional adaptations of objects may be needed in order to stabilize the revised source code base. The developer can attempt an additional refactoring operation (e.g., refactoring operation 208O in order to place the source code in a state for subsequent check-in.

In some implementations, refactoring operation 208f may result in a less than optimal adaptation of additional software objects (e.g., objects 251-300 associated with object entities 218 included in operation entity 204f associated with refactoring operation 208O. The developer may choose to revert the refactoring operation 208f. As described previously, if a changelist did not include operation entities, the developer would either revert or discard all refactoring operations 208a-f or revert every object (e.g., objects 1-300) adapted by the refactoring operations 208a-f. However, using operation entities in a changelist as shown in FIG. 2A, the developer can revert the single refactoring operation 208f by reverting objects 251-300, associated with object identifiers 218.

Figure 2B:
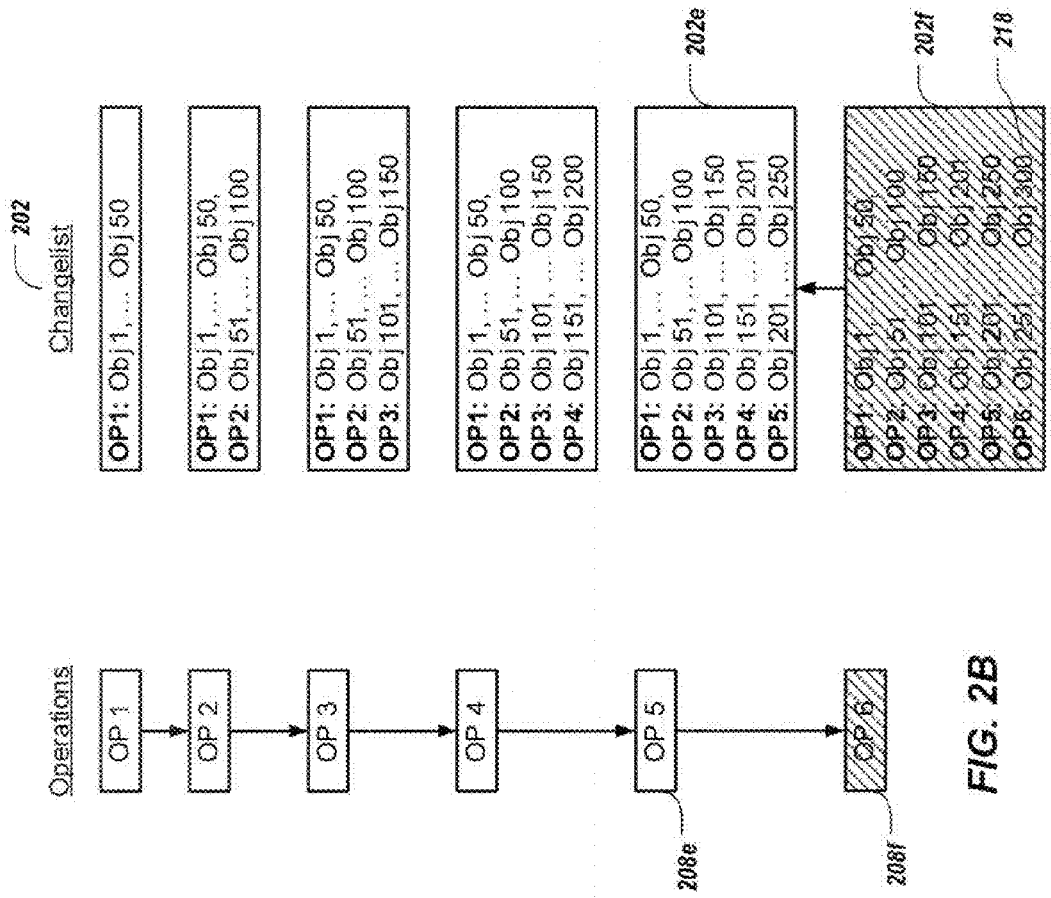
FIG. 2B is an exemplar reversion of the changelist of FIG. 2A in accordance with implementations of the present disclosure.

Referring to FIG. 2B, an exemplar reversion of the changelist 202 of FIG. 2A in accordance with implementations of the present disclosure is shown. Objects 251-300 associated with object identifiers 218 can return to their previous state, which was their state prior to the source code check-out as objects 251-300 were not adapted by any previous refactoring operations. The source code will revert to the state it was in after performing refactoring operation 208e and before performing refactoring operation 208f.

For example, a developer can check-in or revert all objects adapted by the same refactoring operation (e.g., all objects whose associated object identifiers are included in an operation entity associated with the refactoring operation). Additionally, a developer can check-in or revert additional objects if they can be reached directly or indirectly via the objects that belong to the same refactoring operation.

As described with reference to FIG. 2A, the developer can revert refactoring operation 208f. Changelist view 202f can revert to changelist view 202e. Refactoring operation 208e can be the last refactoring operation performed as indicated by the associated operation entity 204e in the changelist 202 by changelist view 202e.

In some implementations, a developer may choose to revert a refactoring operation in a series of refactoring operations where the selected refactoring operation is not the last refactoring operation performed. For example, the selected refactoring operation may have occurred one or more refactoring operations before the last refactoring operation. In some implementations, a refactoring operation may adapt an object adapted by a previous refactoring operation. In some implementations, a developer may choose to revert a particular object. In order to revert a particular object, additional objects and refactoring operations may also need to be reverted. In these implementations, it may be necessary to determine a subset of operations and objects included in a changelist for reversion.

Figure 3:
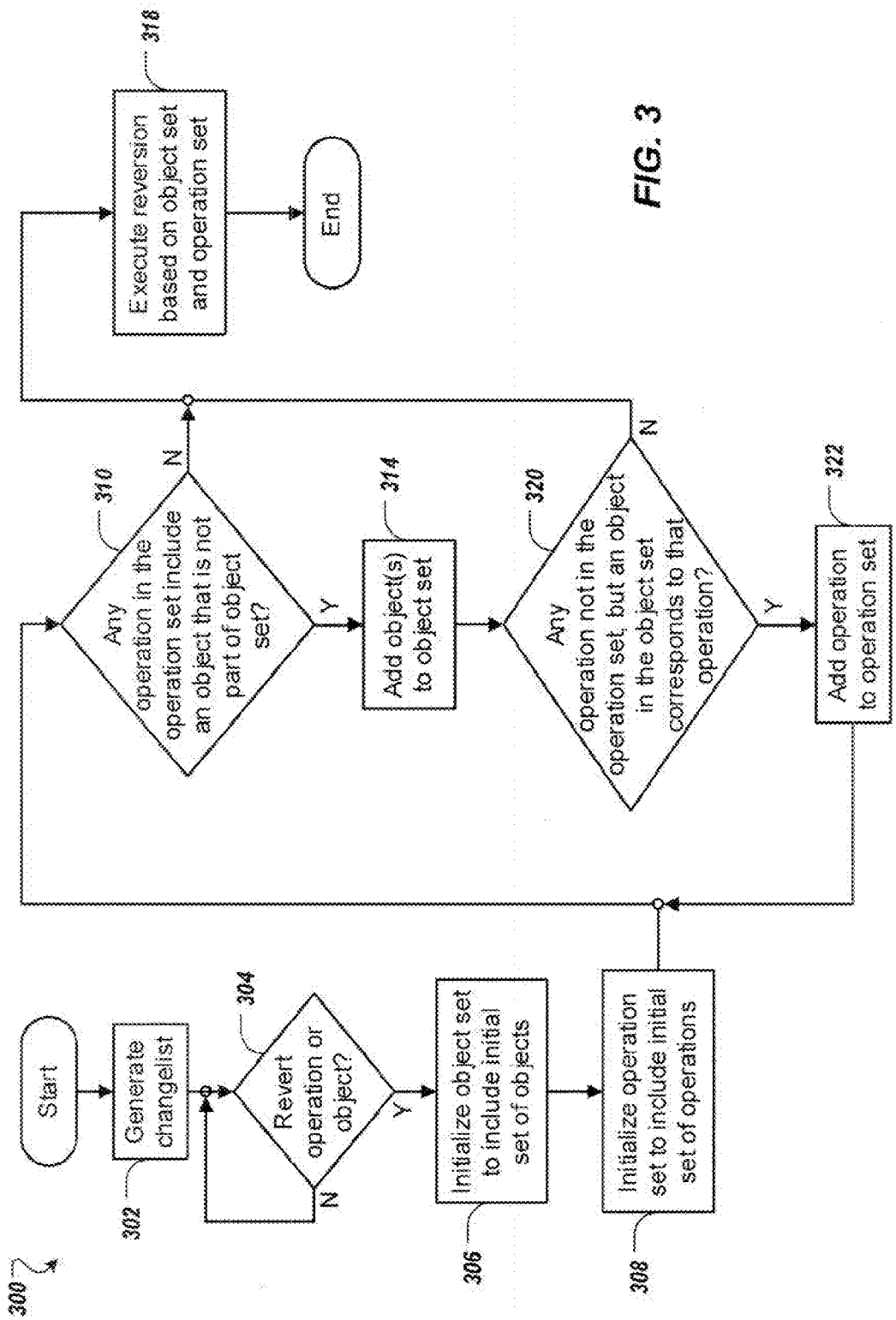
FIG. 3 is a flowchart illustrating exemplar steps that can be executed in accordance with implementations of the present disclosure.

Referring to FIG. 3, a flowchart illustrates exemplar steps 300 that can be executed in accordance with implementations of the present disclosure is shown. In some implementations, reverting a refactoring operation can involve reverting a plurality of objects and additional refactoring operations. For example, a developer can check-in or revert all objects adapted by the same refactoring operation (e.g., all objects whose associated object identifiers are included in an operation entity associated with the refactoring operation). Additionally, a developer can check-in or revert additional objects if they can be reached directly or indirectly via the objects that belong to the same refactoring operation. For example, a subset of objects can be related directly or indirectly to a given set of operations. A direct relationship of an object to an operation can be defined as an object belonging to at least one refactoring operation in a set of refactoring operations. An indirect relationship of an object to an operation can be defined as a chain of one or more objects related to another object that is directly related to at least one refactoring operation in a set of refactoring operations.

The exemplar steps 300 can partition objects in a changelist into a plurality of independent partitions. One partition can include objects to revert, while another partition can include objects not to revert, for example.

In step 302, a changelist is generated. For example, a developer can perform a plurality of refactoring operations to generate a changelist 202 as shown in FIG. 2A. In step 304, it is determined whether the developer would like to revert an object or an operation. If the developer chooses to revert an object or operation, an object set is initialized to include an initial set of objects in step 306, on which initial set of objects transitive closure calculations can be executed. For example, if a developer chooses to revert a particular refactoring operation, the object set can include the object identifiers included in the operation entity associated with the particular refactoring operation. The object identifiers identify the objects to be reverted. In another example, if a developer chooses to revert an object, the object set can include the associated object identifier for the object.

In step 308, an operation set is initialized to include an initial set of operations. If a developer chooses to revert a refactoring operation, the operation set can include the selected refactoring operation. Additionally, the operation set can include all operations that adapt one or more objects in the initialized object set. For example, a refactoring operation has associated with it an operation entity in the changelist. The operation entity can include object identifiers associated with objects adapted by the operation. The operation set can include all operations associated with operation entities in the changelist that include at least one of the object identifiers in the object set.

In step 310, the operations in the operation set are checked against the object set. If any operation in the operation set includes one or more objects that are not part of the object set, the object(s) are added to the object set in step 314. If any operation in the operation set does not include objects that are not part of the object set, a reversion is executed on the object set and the operation set in step 318. The object set can include the transitive closure for all objects in the object set. The SCM application can revert the objects in the object set to the object state prior to any refactoring operations (e.g., the object is returned to its state prior to the source code check-out, reflective of the prior source code check-in).

In step 320, the objects in the object set are checked against the operation set. If any object in the object set is included in an operation not included in the operation set, the operation is added to the operation set in step 322. The process continues back to step 310 to recheck the operations in the operation set against the object set. If any object in the object set is not included in an operation that is not part of the operation set, a reversion is executed on the object set and the operation set in step 318. The object set can include the transitive closure for all objects in the object set. The SCM application can revert the objects in the object set to the object state prior to any refactoring operations (e.g., the object is returned to its state prior to the source code check-out, reflective of the prior source code check-in) by reverting the entire transitive closure for each object.

Figure 4A:
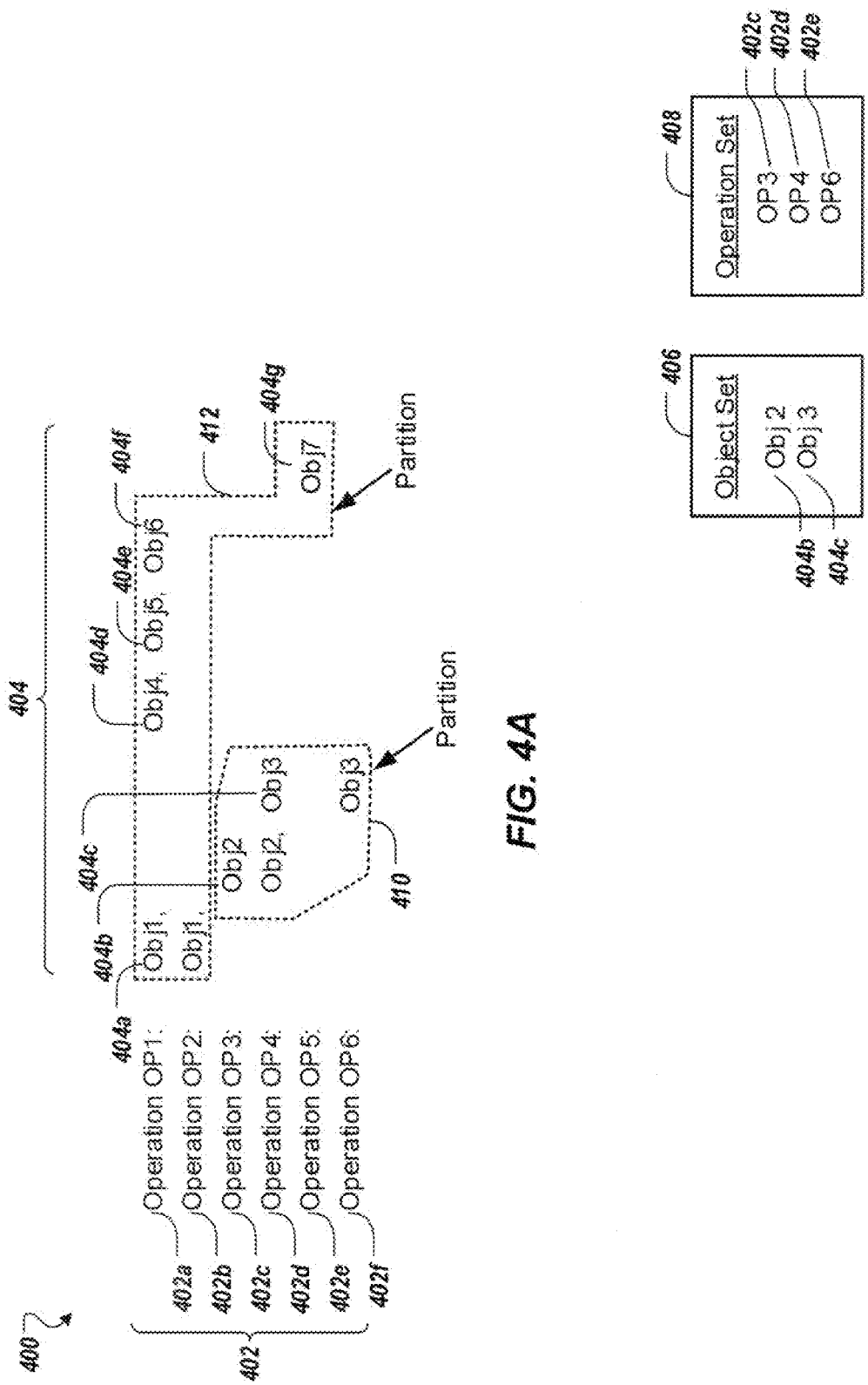
FIG. 4A is an exemplar table including refactoring operations and corresponding objects.

Referring to FIG. 4A, a first exemplar table 400 including refactoring operations 402 and corresponding objects 404 is shown. In the example of FIG. 4A, a developer has chosen to revert operation 402d. Using the exemplar steps 300 in FIG. 3, the SCM application can determine the objects and operations to revert. The table 400 can include two partitions 410, 412. Partition 410 can include the objects and operations to revert. Partition 412 can include the objects and operations that do not need reverting.

Figure 4B:
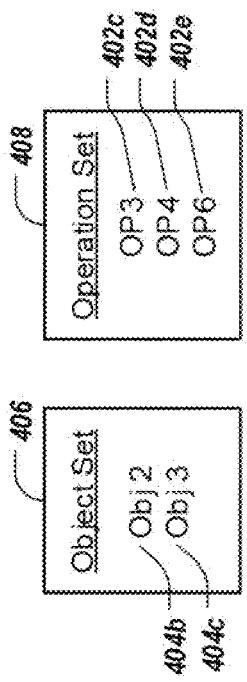
FIG. 4B provides an exemplar object set and an exemplar operation set based on an exemplar reversion to an operation of FIG. 4A.

FIG. 4B provides an exemplar object set 406 and an exemplar operation set 408 based on an exemplar reversion to the operation 402d of FIG. 4A. In the exemplar table 400, operation 402d adapts objects 404b and 404c. To revert operation 402d, the SCM application can also revert operation 402c as operation 402c adapts object 404b, which is also adapted by operation 402d. Additionally, the SCM application can revert operation 402f as operation 402f adapts object 404c. Operations 402a, 402b and 402e are not reverted as they do not adapt objects 404b or 404c. Therefore, object set 406 includes objects 404b, 404c. The operation set 408 includes operations 402c, 402d, 402f.

The SCM application, using the changelist and operation entities, and executing the steps 300 in FIG. 3 can determine a subset of objects and operations to revert as shown in the exemplar table 400 in FIG. 4. The number of objects and operations to revert can be reduced compared to reverting all objects and operations in the implementations where the changelist does not include operation entities.

Referring to FIG. 5A, a second exemplar table 500 including refactoring operations 502 and corresponding objects 504 is shown. In the example in FIG. 5A, a developer has chosen to revert object 504a. Using the exemplar steps 300 in FIG. 3, the SCM application can determine the objects and operations to revert. The table 500 can include two partitions 510, 512. Partition 510 can include the objects and operations to revert. Partition 512 can include the objects and operations that do not need reverting.

FIG. 5B provides an exemplar object set 506 and an exemplar operation set 508 based on an exemplar reversion to the object 502a of FIG. 4A. In the exemplar table 500, operation 502a adapts objects 504a, 504e. To revert object 504a, the SCM application can also revert operation 502b as operation 502b adapts objects 504a, 504b. Additionally, the SCM application can revert operation 502c as operation 502c adapts objects 504b, 504c. The SCM application can revert operation 502e as operation 502e adapts objects 504c, 504d. Operation 502d is not reverted as it does not adapt objects 504a-e. Therefore, object set 506 includes objects 504a-e. The operation set 508 includes operations 502a, 502b, 502c, and 502e.

The SCM application, using the changelist and operation entities, and executing the steps 300 in FIG. 3 can determine a subset of objects and operations to revert as shown in the exemplar table 500 in FIG. 5. The number of objects and operations to revert can be reduced compared to reverting all objects and operations in the implementations where the changelist does not include operation entities.

As described in FIG. 3, the exemplar steps 300 can create an object set that can include the transitive closure for all objects in the object set. The SCM application can revert the objects in the object set to the object state prior to any refactoring operations (e.g., the object is returned to its state prior to the source code check-out, reflective of the prior source code check-in) by reverting the entire transitive closure for each object. As described, this can involve fewer object reversions compared to discarding all refactoring operations on all objects or reverting all objects in a changelist.

In some implementations, an SCM application can include an undo operation. As described above, an SCM application can maintain a version of each object in a source code file in the file system of the local client after each refactoring operation to adapt the object. The object versions can be saved in chronological order on the local client responsible for the check-out of the file. In some implementations, a changelist ID can be associated with each historical object version.

In some implementations, an SCM application can maintain a historical version of each object in a source code file in the file system of the local client after each adaptation of the object. A changelist can represent a sequential view of the object adaptations. If the changelist does not include an operation entity, each object adaptation is not associated with the operation that generated the adaptation. If a developer chooses a refactoring operation to revert, the developer can manually undo the changes to the objects adapted by the selected refactoring operation to return the objects to their state prior to the selected refactoring operation. If the changelist includes operation entities (e.g., changelist 202 in FIG. 2), each object adaptation is associated with the operation that generated the adaptation. If a developer chooses a refactoring operation to revert, the SCM application can automatically undo the changes to the objects adapted by the selected refactoring operation to return the objects to their state prior to the selected refactoring operation. The SCM application can use the operation entity to identify the object identifiers associated with the objects adapted by the selected refactoring operation in order to identify which stored objects to access on the local client. For example, the SCM application can automatically undo the changes to an object adapted by the selected refactoring operation object by reverting the object back to the historical version of the object stored on the local client prior to the selected refactoring operation.

Referring now to FIG. 6A, an exemplar changelist 602 that can be generated in accordance with implementations of the present disclosure is shown. A developer may perform a series of refactoring operations on an existing source code base. For example, a developer, using a local client (e.g., client 108) can connect to an application server (e.g., application server 102) by way of a network (e.g., network 106). The developer can run a SCM application hosted on the application server (e.g., application server 102). The developer can check-out one or more source code files that may include one or more objects for one or more refactoring operations (the SCM application can download copies of the source code files from the central repository (e.g., database 104) to the local client (e.g., client 108)). Upon initial check-out of one or more source code files, the SCM application can generate a changelist on the developer's local client (e.g., client 108) in a local changelist file. The SCM application can maintain historical versions of the source code files and objects on the local client (e.g., client 108).

In some implementations, the changelist can include an operation entity. The operation entity can include one or more object identifiers. The operation entity can be associated with a refactoring operation. Each object identifier can be associated with a software object adapted by the refactoring operation associated with the operation entity. In the example in FIG. 6A, a developer can perform a one or more refactoring operations 608. The changelist 602 can include operation entities 604*a*, 604*b*. Refactoring operations 608*a*, 608*b* can be associated with operation entities 604*a*, 604*b*, respectively. Fifty object identifiers 606 can be included in operation entity 604*a*. Each object identifier 606 can be associated with a software object (e.g., object identifier 606*a* can be associated with software object 1) adapted by the refactoring operation 608*a*.

For example, refactoring operation 608*a* can involve the adaptation of fifty different objects (e.g., object 1 and an additional forty-nine objects, objects 2-50) associated with object identifiers 606 in the operation entity 604*a* in the changelist 602. Upon completion of the refactoring operation 608*a*, the changelist 602 can be updated to include operation entity 604*a* as in changelist view 602*a*. The SCM application can store the state of the objects 1-50 in the file system on the local client after performing refactoring operation 608*a* and before performing refactoring operation 608*b*. The developer can continue to perform refactoring operations (e.g., refactoring operations 608*b*).

Operation entity 604*b* can be associated with refactoring operation 608*b*. Ten object identifiers 610 can be included in operation entity 604*b*. Each object identifier 610 can be associated with a software object (e.g., object identifier 610*a* can be associated with software object 1) adapted by the refactoring operation 608*b*. Refactoring operation 608*b* can involve the adaptation of ten of the same objects (e.g., objects 1-10) adapted by refactoring operation 608*a*. The new adaptation of objects 1-10 (e.g., objects 1'-10') can be associated with object identifiers 610 in the operation entity 604*b* in the changelist 602. Upon completion of the refactoring operation 608*b*, the changelist 602 can be updated to include operation entity 604*b* as shown in changelist view 602*b*. The SCM application can store the state of the objects 1-10 (e.g., objects 1'-10') in the file system of the local client after performing refactoring operation 608*b*. A history view of the local file system can show the location in the file system of each version of the objects.

In some implementations, refactoring operation 608*b* may result in a less than optimal adaptation of the software objects (e.g., objects 1-10 associated with object entities 610 included in operation entity 604*b* associated with refactoring operation 608*b*). The developer may choose to revert the last refactoring operation performed, refactoring operation 608*b*. As described previously, if the changelist did not include operation entities, the developer would need to manually revert objects 1-10 (objects identified with object identifiers 610) adapted by the selected reverted refactoring operation 608*b* back to their saved state in the file system on the local client after refactoring operation 604*a* but before refactoring operation 604*b*. However, using operation entities in a changelist as shown in FIG. 6A, the SCM application can automatically revert the single refactoring operation 608*b* by restoring objects 1-10 to their saved state in the file system on the local client after refactoring operation 604*a* but before refactoring operation 604*b*. In effect, the SCM application can perform an undo of the refactoring operation 608*b*.

In the implementation described in FIG. 6A, if the SCM application did not have historical versions of the source code files and objects accessible from the file system on the local client in order to revert refactoring operation 604*b*, the SCM application would need to determine the transitive closure for objects 1-10. The SCM application can then perform the complete transitive closure for objects 1-10 restoring them to their states prior to the check-out of the source code for the refactoring operations 608. When historical versions of the objects are available in the file system of the local client, the SCM application can undo the selected reverted refactoring operation, which essentially performs a partial transitive closure of the objects included in the reverted operation. The objects can be restored to a state prior to the reverted refactoring operation.

Referring to FIG. 6B, an exemplar reversion of the changelist 602 of FIG. 6A in accordance with implementations of the present disclosure is shown. As described with reference to FIG. 6A, the developer can revert refactoring operation 608*b*. Changelist view 602*b* can revert to changelist view 602*a*. Refactoring operation 608*a* can be the last refactoring operation performed as indicated by the associated operation entity 604*a* in the changelist 602 by changelist view 602*a*.

Referring to FIG. 7A, a third exemplar table 700 including refactoring operations 702 and corresponding objects 704 is shown. In the example in FIG. 7A, a developer has chosen to revert operation 702*c*. The table 700 can include two partitions 710, 712. Partition 710 can include the objects and operations to revert. Partition 712 can include the objects and operations that do not need reverting. In calculating the partial transitive closure for objects directly or indirectly adapted by refactoring operation 704c, the SCM application, using a changelist and operation entities, can execute the steps 300 in FIG. 3. However, if historical versions of the objects are available to the SCM application from the file system of the local client that includes the changelist, the SCM application can calculate a partial transitive closure for objects. In the example in FIG. 7A, steps 300 are performed using operations 702c-702f (the selected reverted refactoring operation and any subsequent operations). Operations 702a, 702b may not be included in the execution of steps 300.

FIG. 7B provides an exemplar object set 706 and an exemplar operation set 708 based on an exemplar reversion to the operation 702c of FIG. 7A. In the exemplar table 700, operation 702c adapts object 704a and object 704b. In order to revert operation 702c, the SCM application can also revert subsequent operation 702d as operation 702d further adapts object 704b and adapts object 704c. The SCM can also revert operation 704f, which further adapts object 704c and adapts object 704d. Operation 702e is not reverted as it does not adapt objects 704a, 704b, 704c or 704d. Therefore, object set 706 includes objects 704a, 704b, 704c and 704d. The operation set 408 includes operations 702c, 702d, and 702f.

The SCM application can undo the refactoring operations included in the operation set 708. The undo operation essentially performs a partial transitive closure of the objects included in the object set 706. The objects in object set 706 can be restored to a state prior to the reverted refactoring operation (operation 702c).

Figure 8A:
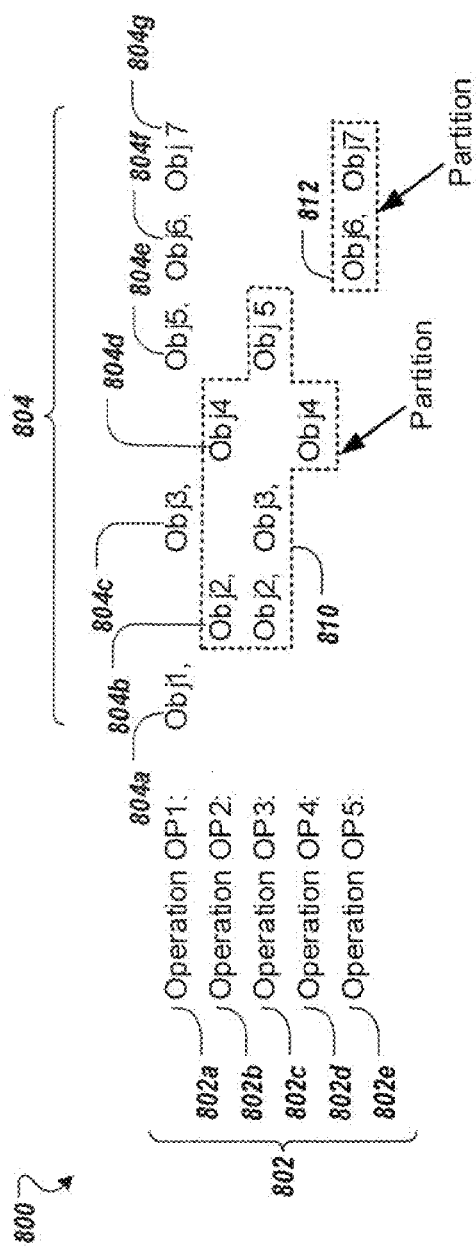
FIG. 8A is another exemplar table including refactoring operations and corresponding objects.

Referring to FIG. 8A, a fourth exemplar table 800 including refactoring operations 802 and corresponding objects 804 is shown. In the example in FIG. 8A, a developer has chosen to completely revert object 804b. The table 800 can include two partitions 810, 812. Partition 810 can include the objects and operations to revert. Partition 812 can include the objects and operations that do not need reverting. In calculating the partial transitive closure for objects directly or indirectly adapted by refactoring operations that also adapt object 804b, the SCM application, using a changelist and operation entities, can execute the steps 300 in FIG. 3. However, if historical versions of the objects are available to the SCM application from the file system of the local client that includes the changelist, the SCM application can calculate a partial transitive closure for objects. In the example in FIG. 8A, steps 300 are performed using operations 802b-802e as object 804b is not adapted by previous refactoring operation 802a. Therefore, it is not necessary to revert operation 802a in order to completely revert object 804b. Operation 802a may not be included in the execution of steps 300.

Figure 8B:
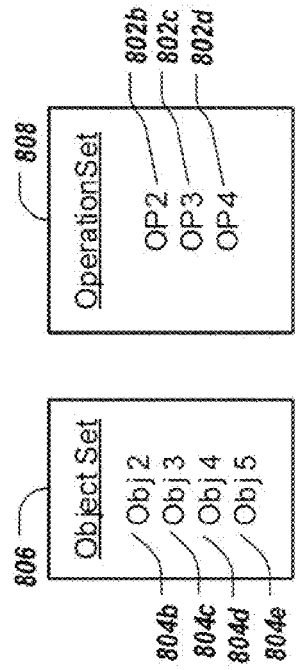
FIG. 8B provides an exemplar object set and an exemplar operation set based on an exemplar reversion to an object of FIG. 8A.

FIG. 8B provides an exemplar object set 806 and an exemplar operation set 808 based on an exemplar reversion of object 802b in FIG. 8A. In the exemplar table 800, operation 802b adapts object 804b and object 804d. In order to revert object 804b, the SCM application can also revert subsequent operation 802c as operation 802c further adapts object 804b and adapts object 804c and object 804e. The SCM can also revert operation 804d, which further adapts object 804d. Operation 802e is not reverted as it does not adapt objects 804b, 804c, 804d or 804e. Therefore, object set 806 includes objects 804b, 804c, 804d and 804e. The operation set 808 includes operations 802b, 802c, and 802d.

The SCM application can undo the refactoring operations included in the operation set 808. The undo operation essentially performs a partial transitive closure of the objects included in the object set 806. Since operation 802a does not adapt object 804b, which was selected for a complete reversion, the undo operation results in the complete reversion of object 804b (object 804b is returned to the state prior to check-out of the source code and before any refactoring operations were performed). The objects in object set 806 can be restored to a state prior to operation 802b (their state after operation 802a was performed).

In some implementations, the SCM application can maintain a historical record of the differences between each chronological version of an object. The SCM application can recreate an object at a point time using the record of the changes made to the object from its previous versions to its current version at that point in time.

Figure 9:
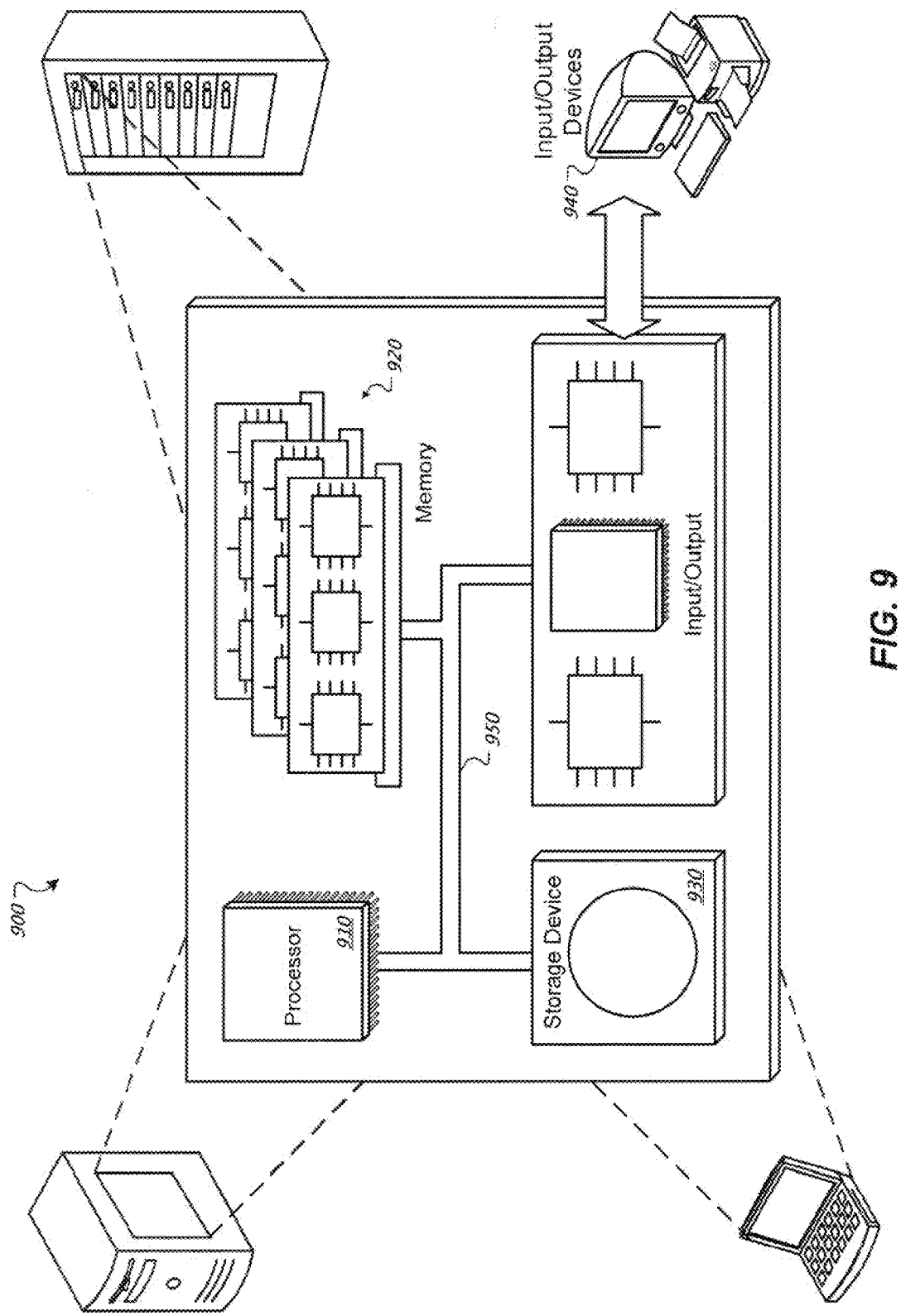
FIG. 9 is a schematic illustration of exemplar computer systems that can be used to execute implementations of the present disclosure.

Referring now to FIG. 9, a schematic illustration of exemplar hardware components 900 that can be used to execute implementations of the present disclosure is provided. The system 900 can be used for the operations described in association with the method described in FIG. 3 according to one implementation. For example, the system 900 may be included in the application server 102. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can, be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
   accessing computer code from a repository at a computer;
   registering a plurality of operations on the computer code at the computer;
   generating a changelist based on the operations, the changelist comprising a plurality of computer code objects affected by the operations;
   initiating a reversion operation to revert one or more of the computer code objects to a previous state;
   partitioning the computer code objects to provide independent first and second partitions, the first partition including an object set based on the computer code objects; and
   executing the reversion operation based on only the first partition including the object set.

2. The method of claim 1, wherein initiating the reversion operation comprises receiving an identification of an object of the plurality of computer code objects for reversion, and wherein partitioning comprises generating the object set based on the object.

3. The method of claim 1, wherein initiating the reversion operation comprises receiving an identification of an operation of the plurality of operations for reversion, and wherein partitioning comprises generating the object set based on the operation.

4. The method of claim 1, further comprising generating an operation set comprising a plurality of affected operations, wherein executing the reversion operation is further based on the operation set.

5. The method of claim 1, wherein partitioning the computer code objects comprises:
   generating the object set including an object to be reverted;
   generating an operation set including an affected operation;
   determining that another object corresponds to the affected operation; and
   adding the other object to the object set.

6. The method of claim 1, wherein partitioning the computer code objects comprises:
   generating an operation set including an operation to be reverted;
   generating the object set including an affected object;
   determining that another operation corresponds to the affected object; and
   adding the other operation to the operation set.

7. The method of claim 1, wherein at least one of the operations comprises a refactoring operation.

8. A computer-readable storage medium coupled to one or more processors and having instructions stored thereon which, when executed by the one or more processors, cause the one or more processors to perform operations comprising:
   accessing computer code from a repository at a computer;
   registering a plurality of operations on the computer code at the computer;
   generating a changelist based on the operations, the changelist comprising a plurality of computer code objects affected by the operations;
   initiating a reversion operation to revert one or more of the computer code objects to a previous state;
   partitioning the computer code objects to provide independent first and second partitions, the first partition including an object set based on the computer code objects; and
   executing the reversion operation based on only the first partition including the object set.

9. The computer-readable storage medium of claim 8, wherein initiating the reversion operation comprises receiving an identification of an object of the plurality of computer code objects for reversion, and wherein partitioning comprises generating the object set based on the object.

10. The computer-readable storage medium of claim 8, wherein initiating the reversion operation comprises receiving an identification of an operation of the plurality of operations for reversion, and wherein partitioning comprises generating the object set based on the operation.

11. The computer-readable storage medium of claim 8, wherein the operations further comprise generating an operation set comprising a plurality of affected operations, wherein executing the reversion operation is further based on the operation set.

12. The computer-readable storage medium of claim 8, wherein partitioning the computer code objects comprises:
generating the object set including an object to be reverted;
generating an operation set including an affected operation;
determining that another object corresponds to the affected operation; and
adding the other object to the object set.

13. The computer-readable storage medium of claim 8, wherein partitioning the computer code objects comprises:
generating an operation set including an operation to be reverted;
generating the object set including an affected object;
determining that another operation corresponds to the affected object; and
adding the other operation to the operation set.

14. The computer-readable storage medium of claim 8, wherein at least one of the operations comprises a refactoring operation.

15. A system, comprising:
a database having computer code stored thereon; and
a computer that is in communication with the database, the computer processing instructions to cause one or more processors to perform operations comprising:
accessing computer code from the database at the computer;
registering a plurality of operations on the computer code at the computer;
generating a changelist based on the operations, the changelist comprising a plurality of computer code objects affected by the operations;
initiating a reversion operation to revert one or more of the computer code objects to a previous state;
partitioning the computer code objects to provide independent first and second partitions, the first partition including an object set based on the computer code objects; and
executing the reversion operation based on only the first partition including the object set.

16. The system of claim 15, wherein initiating the reversion operation comprises receiving an identification an object of the plurality of computer code objects for reversion, and wherein partitioning comprises generating the object set based on the object.

17. The system of claim 15, wherein initiating the reversion operation comprises receiving an identification an operation of the plurality of operations for reversion, and wherein partitioning comprises generating the object set based on the operation.

18. The system of claim 15, wherein the operations further comprise generating an operation set comprising a plurality of affected operations, wherein executing the reversion operation is further based on the operation set.

19. The system of claim 15, wherein partitioning the computer code objects comprises:
generating the object set including an object to be reverted;
generating an operation set including an affected operation;
determining that another object corresponds to the affected operation; and
adding the other object to the object set.

20. The system of claim 15, wherein partitioning the computer code objects comprises:
generating an operation set including an operation to be reverted;
generating the object set including an affected object;
determining that another operation corresponds to the affected object; and
adding the other operation to the operation set.

21. The system of claim 15, wherein at least one of the operations comprises a refactoring operation.

* * * * *